United States Patent
Tzur-David

(10) Patent No.: US 11,082,406 B2
(45) Date of Patent: Aug. 3, 2021

(54) SYSTEM AND METHOD FOR PROVIDING END-TO-END SECURITY OF DATA AND METADATA

(71) Applicant: SECRET DOUBLE OCTOPUS LTD, Tel-Aviv (IL)

(72) Inventor: Shimrit Tzur-David, Mevaseret Zion (IL)

(73) Assignee: SECRET DOUBLE OCTOPUS LTD, Tel-Aviv (IL)

( * ) Notice: Subject to any disclaimer, the term of this patent is extended or adjusted under 35 U.S.C. 154(b) by 351 days.

(21) Appl. No.: 16/203,923

(22) Filed: Nov. 29, 2018

(65) Prior Publication Data

US 2020/0177557 A1 Jun. 4, 2020

(51) Int. Cl.
*H04L 29/06* (2006.01)
*H04L 9/30* (2006.01)
*H04L 9/08* (2006.01)

(52) U.S. Cl.
CPC ........ *H04L 63/0414* (2013.01); *H04L 9/0827* (2013.01); *H04L 9/3026* (2013.01); *H04L 63/0435* (2013.01); *H04L 63/1475* (2013.01)

(58) Field of Classification Search
CPC ............. H04L 63/0414; H04L 63/0435; H04L 63/1475; H04L 9/0827; H04L 9/3026
See application file for complete search history.

(56) References Cited

U.S. PATENT DOCUMENTS

| 5,706,348 | A  | * | 1/1998 | Gray ......................... | H04L 9/12 380/260 |
| 6,240,188 | B1 | * | 5/2001 | Dondeti ................... | H04L 12/18 380/284 |
| 6,266,704 | B1 | * | 7/2001 | Reed ........................ | H04L 45/00 709/238 |
| 7,916,739 | B2 | * | 3/2011 | Trostle ................... | H04L 63/166 370/401 |

(Continued)

OTHER PUBLICATIONS

Kate, Aniket, Greg M. Zaverucha, and Ian Goldberg. "Pairing-based onion routing with improved forward secrecy." ACM Transactions on Information and System Security (TISSEC) 13.4 (2010): 1-32. (Year: 2010).*

(Continued)

*Primary Examiner* — Kari L Schmidt
(74) *Attorney, Agent, or Firm* — Pearl Cohen Zedek Latzer Baratz LLP

(57) ABSTRACT

A system and method for encrypting metadata in a communication system, including defining paths from a source node to a destination node through intermediate nodes and anchor nodes; dividing messages and sending a portion in each path by: dividing the path into sub-paths, where each two contiguous sub-paths are connected by an anchor node; calculating a secret value including a list of nodes of a first sub-path and an encrypted form of a remaining portion of the path; calculating a first random point on a linear line connecting a first metadata share of a symmetric key of the source node and a first intermediate node, and a metadata share including a second x-value of the symmetric key of the (Continued)

source node and the first intermediate node in the path and the secret value; and sending the portion together with the first random point to the first intermediate node.

20 Claims, 5 Drawing Sheets

(56) References Cited

U.S. PATENT DOCUMENTS

| | | | | |
|---|---|---|---|---|
| 8,045,714 | B2* | 10/2011 | Cross | G06F 21/6209 |
| | | | | 380/277 |
| 8,601,283 | B2* | 12/2013 | Jogand-Coulomb | G06F 21/10 |
| | | | | 713/193 |
| 8,700,894 | B2* | 4/2014 | Hammell | H04L 63/0464 |
| | | | | 713/162 |
| 9,599,483 | B2* | 3/2017 | Ye | H04L 45/46 |
| 9,876,823 | B2* | 1/2018 | Smith | H04L 63/20 |
| 10,554,538 | B2* | 2/2020 | Spohn | H04L 45/02 |
| 10,554,637 | B1* | 2/2020 | Bendersky | H04L 9/0894 |
| 10,628,073 | B1* | 4/2020 | Zhao | G06F 3/0641 |
| 10,652,014 | B2* | 5/2020 | Wright | H04L 9/3066 |
| 10,757,007 | B1* | 8/2020 | Walters | H04L 63/0421 |
| 2002/0194209 | A1* | 12/2002 | Bolosky | G06F 16/137 |
| 2006/0034179 | A1* | 2/2006 | Carter | H04L 45/34 |
| | | | | 370/241 |
| 2009/0103734 | A1* | 4/2009 | Hammell | H04L 9/3252 |
| | | | | 380/278 |
| 2010/0135494 | A1* | 6/2010 | Armknecht | H04L 63/06 |
| | | | | 380/270 |
| 2010/0215051 | A1* | 8/2010 | Solis | H04L 45/54 |
| | | | | 370/408 |
| 2010/0260337 | A1* | 10/2010 | Song | H04W 12/033 |
| | | | | 380/270 |
| 2010/0318468 | A1* | 12/2010 | Carr | G06Q 20/027 |
| | | | | 705/79 |
| 2013/0173910 | A1* | 7/2013 | Hong | H04L 9/0869 |
| | | | | 713/153 |
| 2013/0251145 | A1* | 9/2013 | Lowans | H04L 9/0858 |
| | | | | 380/44 |
| 2014/0082358 | A1* | 3/2014 | Nakhjiri | H04L 9/0844 |
| | | | | 713/168 |
| 2014/0250301 | A1* | 9/2014 | Chang | H04L 63/18 |
| | | | | 713/169 |
| 2015/0156172 | A1* | 6/2015 | Nandi | H04L 67/306 |
| | | | | 713/153 |
| 2015/0341329 | A1* | 11/2015 | Mosko | H04L 9/0827 |
| | | | | 726/3 |
| 2016/0134593 | A1* | 5/2016 | Gvili | H04L 63/10 |
| | | | | 713/170 |
| 2016/0261486 | A1* | 9/2016 | Fang | H04L 45/04 |
| 2016/0294794 | A1* | 10/2016 | Mancie | H04L 63/0421 |
| 2016/0315850 | A1* | 10/2016 | Dara | H04L 41/0866 |
| 2017/0085537 | A1* | 3/2017 | Benedek | H04L 63/062 |
| 2017/0093811 | A1* | 3/2017 | Dolev | H04L 45/1287 |
| 2018/0077428 | A1* | 3/2018 | Dhuse | H04L 1/0045 |
| 2018/0292522 | A1* | 10/2018 | Cavendish | G01S 13/534 |
| 2018/0337782 | A1* | 11/2018 | Wu | H04L 9/14 |
| 2019/0052458 | A1* | 2/2019 | Wright | H04L 9/0825 |
| 2019/0089720 | A1* | 3/2019 | Aditham | H04L 63/0442 |
| 2019/0306135 | A1* | 10/2019 | Mudulodu | H04L 63/1475 |
| 2020/0274700 | A1* | 8/2020 | Wright | H04L 9/0844 |
| 2021/0034790 | A1* | 2/2021 | Charles | H04L 9/0825 |

OTHER PUBLICATIONS

Shirazi, Fatemeh, et al. "A survey on routing in anonymous communication protocols." ACM Computing Surveys (CSUR) 51.3 (2018): 1-39. (Year: 2018).*

J. Hiller, J. Pennekamp, M. Dahlmanns, M. Henze, A. Panchenko and K. Wehrle, "Tailoring Onion Routing to the Internet of Things: Security and Privacy in Untrusted Environments," 2019 IEEE 27th International Conference on Network Protocols (ICNP), 2019, pp. 1-12. (Year: 2019).*

Roger Dingledine et al. "Tor: The second generation onion router" In Proceedings of the 13th Conference on USENIX Security Symposium—vol. 13, SSYM'04, pp. 21-21, Berkeley, CA, USA, 2004. USENIX Association.

David Goldschlag et al. "Onion routing", Commun, ACM, 42(2):39-41, Feb. 1999.

Sachin Katti et al. "Slicing the Onion: Anonymous Routing without PKI", 4th ACM Workshop on Hot Topics in Networks (HotNets), College Park, MD, Nov. 2005.

Morteza Yousefi Kharaji et al. "A fast survey focused on methods for classifying anonymity requirements", (IJCSIS) International Journal of Computer Science and Information Security, vol. 12, No. 4, Apr. 2014.

Albert Kwon et al. "Riffle: An efficient communication system with strong anonymity", PoPETs, 2016(2):115-134, 2016.

Alan Mislove et al. "Ap3: Cooperative, decentralized anonymous communication", In Proceedings of the 11th Workshop on ACM SIGOPS European Workshop, EW 11, New York, NY, USA, 2004. ACM.

Prateek Mittal et al. "Information leaks in structured peer-to-peer anonymous communication systems" ACM Trans. Inf. Syst. Secur., 15(1):5:1-5:28, Mar. 2012.

Steven J. Murdoch et al. "Low-cost traffic analysis of tor", In Proceedings of the 2005 IEEE Symposium on Security and Privacy, SP'05, pp. 183-195, Washington, DC, USA, 2005. IEEE Computer Society.

Steven J. Murdoch et al. "Sampled traffic analysis by internet exchange-level adversaries", In Nikita Borisov and Philippe Golle, editors, Privacy Enhancing Technologies, 7th International Symposium, PET 2007 Ottawa, Canada, Jun. 20-22, 2007, Revised Selected Papers, vol. 4776 of Lecture Notes in Computer Science, pp. 167-183. Springer, 2007.

Michael K. Reiter et al. "Crowds: Anonymity for web transactions" ACM Trans. Inf. Syst. Secur., 1(1):66-92, Nov. 1998.

Adi Shamir "How to share a secret", Commun. ACM, 22(11):612-613, Nov. 1979.

Rob Sherwood et al. "P5: A protocol for scalable anonymous communication", Journal of Computer Security, vol. 13, p. 839-876, Dec. 2005.

DJ Watts et al. "Collective dynamics of 'small-world' networks" Nature, 393(6684):440-442, Jun. 1998.

Jinsong Han Yunhao Liu et al. "Rumor riding: Anonymizing unstructured peer-to-peer systems", IEEE Transactions on Parallel & Distributed Systems, 22:464-475, 2010.

* cited by examiner

SYSTEM AND METHOD FOR PROVIDING END-TO-END SECURITY OF DATA AND METADATA

FIELD OF THE INVENTION

Embodiments of the invention relate to providing end-to-end security of data and metadata during communications, for example in communications systems or social networks. In particular, embodiments of the invention relate to encrypting metadata when sending a message in a communications system.

BACKGROUND OF THE INVENTION

The traditional approach to achieve privacy in communication networks is using a Public Key Infrastructure (PKI) where the two endpoints in a conversation use each other's public key to exchange a symmetric key for data encryption. The public keys are obtained using a trusted third party or entity, e.g., a server or an application, that verifies the identity of the endpoints. There are several problems with this approach. For example, public key cryptography only works because of the math involved. This implies that these algorithms are breakable with enough computational power, the hardness of decryption depends on the length of the used keys. Another problem stems from the use on a third entity, since this third entity can be malicious or compromised. Additionally, this method encrypts only the data, while the path remains public.

According to a onion encryption approach for path anonymity, e.g., to hide the origin and the destination of a message form eavesdroppers and nodes in the path, the source node or entity (e.g. a user or an account of a user in a communication system or a social network) may share or have a key with each node on the path. Each node on the path may receive a message encrypted with its shared key with the source, and transmit a message that is encrypted with the key between the source and the next node on the path. This approach requires having an encryption key between the source and each node in the path, which may be very cumbersome.

A second approach to path anonymity requires that each pair of adjacent nodes on a path has a shared key. A node may obtain a message encrypted with a shared key it has with the previous node on the path, use that shared key to decrypt the message, encrypt the message with the shared key it has with the next node on the path, and send the re-encrypted message to the next node. Thus, each node on the path decrypts the entire path and is exposed to the rest of the path including the destination.

Communications and social network services, and in particular, mobile messaging applications such as WhatsApp® and Messenger®, are gaining an ever-increasing popularity. Many communications or social network services implement end-to-end encryption in order to increase security and privacy of users, by preventing potential eavesdroppers from reading transmitted data. Potential eavesdroppers may be the telecom provider, the Internet provider, or even the provider of the communication service itself. An ideal end-to-end encryption solution should ensure that only the sender and receiver can read the sent messages, and no one in between can interpret these messages, including the service provider.

SUMMARY

According to embodiments of the invention, a system and method for encrypting metadata of a message in a network having a plurality of nodes may include establishing a symmetric key for each pair of adjacent nodes; sending at least a portion of a message from a source node to a destination node in at least one path by: dividing the path connecting the source node and the destination node into a plurality of sub-paths, wherein each two contiguous sub-paths are connected by an anchor node, wherein each of the anchor nodes is adjacent to the source node in the social network, thus having a symmetric key with the source node; within each sub-path in the path: encrypting, by a first node in a sub-path using a symmetric key the first node shares or has with a next node in the sub-path, a list of remaining nodes of the sub-path, and an encrypted form of a remaining portion or section of the path to obtain a layered encrypted path, wherein the remaining portion or section of the path is encrypted using the symmetric key the next anchor node in the sub-path shares with the source node; sending the portion of the data of the message together with the layered encrypted path to a next node in the sub-path; upon receiving the layered encrypted path at the next node: decrypting the layered encrypted path using the symmetric key the first node shares with the next node in the sub-path; and if the next node is an anchor node, decrypting a next sub-path using the symmetric key of the anchor node and the source node.

According to embodiments of the invention, a system and method for encrypting metadata of a message in a social network having a plurality of nodes may include: establishing a symmetric key for each pair of adjacent nodes, wherein the symmetric key may include a first metadata share, $(x_{key1}, y_{key1})$, and a first value, $x_{key2}$; finding a plurality of paths from each node to each of its adjacent nodes; sending a message from a source node to a destination node by: encrypting data of the message; sending at least a portion of the encrypted data from the source node to the destination node in at least one path; wherein sending a portion of the encrypted data on a path may include: dividing the path connecting the source node to the destination node into a plurality of sub-paths, wherein each two contiguous sub-paths are connected by an anchor node, wherein each of the anchor nodes may be adjacent to the source node in the social network, thus having or sharing a symmetric key with the source node; and within each sub-path in the path:

a. calculating, by a first node, i, in a sub-path, a second value, $y_{secret}$, comprising a list of remaining nodes of the sub-path, and an encrypted form of a remaining portion or section of the path;

b. calculating, by the first node a random point $(x_p, y_p)$ on a linear line connecting the first metadata share $(x_{key1}, y_{key1})$ and a second metadata share, wherein the second metadata share comprises the first value and the second value, $(x_{key2}, y_{secret})$;

c. sending the portion of the encrypted data together with the random point $(x_p, y_p)$ to a next node, i+1, in the sub-path;

upon receiving the random point $(x_p, y_p)$ at the next node:

d. reconstructing by the next node a line equation connecting the first metadata share $(x_{key1}, y_{key1})$ and the random point $(x_p, y_p)$;

e. calculating, by the next node, the second value, $y_{secret}$, based on the line equation and on the first value, $x_{key2}$; and f. if the next node is an anchor node, decrypting a next sub-path using the symmetric key of the anchor node and the source node.

Furthermore, according to embodiments of the invention, encrypting data of the message may include: constructing a polynomial of degree k−1, wherein the data is derivable from the polynomial; choosing at least k different $x_i$ values and calculating respective $y_i$ values of the polynomial for each of the $x_i$ values, wherein each pair of an $x_i$ value and a respective $y_i$ value constitutes a data share ($x_i$, $y_i$), wherein the portion of the encrypted data comprises the data share ($x_i$, $y_i$), wherein no intermediate node on the at least one path obtains k or more data shares. The data of the message may be a tree coefficient of the polynomial.

Furthermore, embodiments of the invention may include: sending from the source node to the anchor nodes an indication to inform the anchor node that the anchor node is an anchor node with relation to the metadata. In some embodiments the indication is a portion of the encrypted form of the remaining portion or section of the path.

According to some embodiments, the symmetric key shared between each pair of adjacent nodes may be replaced at known intervals.

According to some embodiments, the symmetric key between each pair of adjacent nodes may be replaced following a request of the source node.

According to some embodiments, decrypting a next sub-path using the symmetric key of the anchor node and the source node may include reconstructing a second linear line equation for a line connecting a first metadata share of the symmetric key of the source node and the anchor node ($x_{key1}$, $y_{key1}$) and a random point included in $y_{secret}$; and finding a corresponding y-value to a first value of the symmetric key of the source node and the anchor node, $x_{key2}$ using the second linear line equation.

According to some embodiments, sending the portion of the encrypted data within each sub-path on the path may include: dividing the second value, into $y_{secret}$, a plurality of chunks; and repeating operations a-f for each of the chunks.

Embodiments of the invention may include designating anchor nodes along the paths.

Embodiments of the invention may include padding the second value, $y_{secret}$, by the first node to a predetermined length.

According to embodiments of the invention, a system and method for encrypting metadata of a message in a social network, may include: a plurality of nodes, wherein each pair of adjacent nodes share or have a symmetric key, wherein the symmetric key comprises a first x-value and a first y-value of a first metadata share, and a second x-value and wherein the plurality of nodes may include: a source node; a destination node; a plurality of intermediate nodes, wherein some of the intermediate nodes are anchor nodes, wherein each of the anchor nodes is adjacent to the source node in the social network, thus having a symmetric key with the source node, wherein a plurality of paths from the source node to the destination node through the intermediate nodes and the anchor nodes are defined; wherein the source node may be configured to send a message to the destination node by: sending at least a portion of data of the message to the destination node in at least one path; wherein sending a portion of the data of the message in a path may include: dividing the path into a plurality of sub-paths, wherein each two contiguous sub-paths are connected by one of the anchor nodes; calculating a secret value comprising a list of nodes of a first sub-path and an encrypted form of a remaining portion or section of the path; calculating a first random point on a linear line connecting a first metadata share of a symmetric key of the source node and a first intermediate node in the path, and a metadata share comprising a second x-value of the symmetric key of the source node and the first intermediate node in the path and the secret value; and sending the portion of the data of the message together with the first random point to the first intermediate node in the path.

According to embodiments of the invention, an intermediate node may be configured to: upon receiving a second random point from a previous node in the path: reconstruct a line equation connecting the first metadata share of the symmetric key of the previous node in the path and the intermediate node, and the second random point; calculate a current secret value based on the line equation and on the second x-value of the symmetric key of the previous node in the path and the intermediate node; if the intermediate node is an anchor node, decrypt a next sub-path using the symmetric key of the anchor node and the source node; calculate a new secret value, comprising a list of nodes of a remaining portion of a sub-path, and an encrypted form of a remaining portion of the path; calculate a new random point on a new linear line connecting a first metadata share of a symmetric key of the intermediate node and a next intermediate node in the path, and a metadata share comprising a second x-value of the symmetric key of the intermediate node and a next intermediate node in the path and the new secret value; and send the portion of the data of the message together with the new random point to the next intermediate node in the sub-path.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
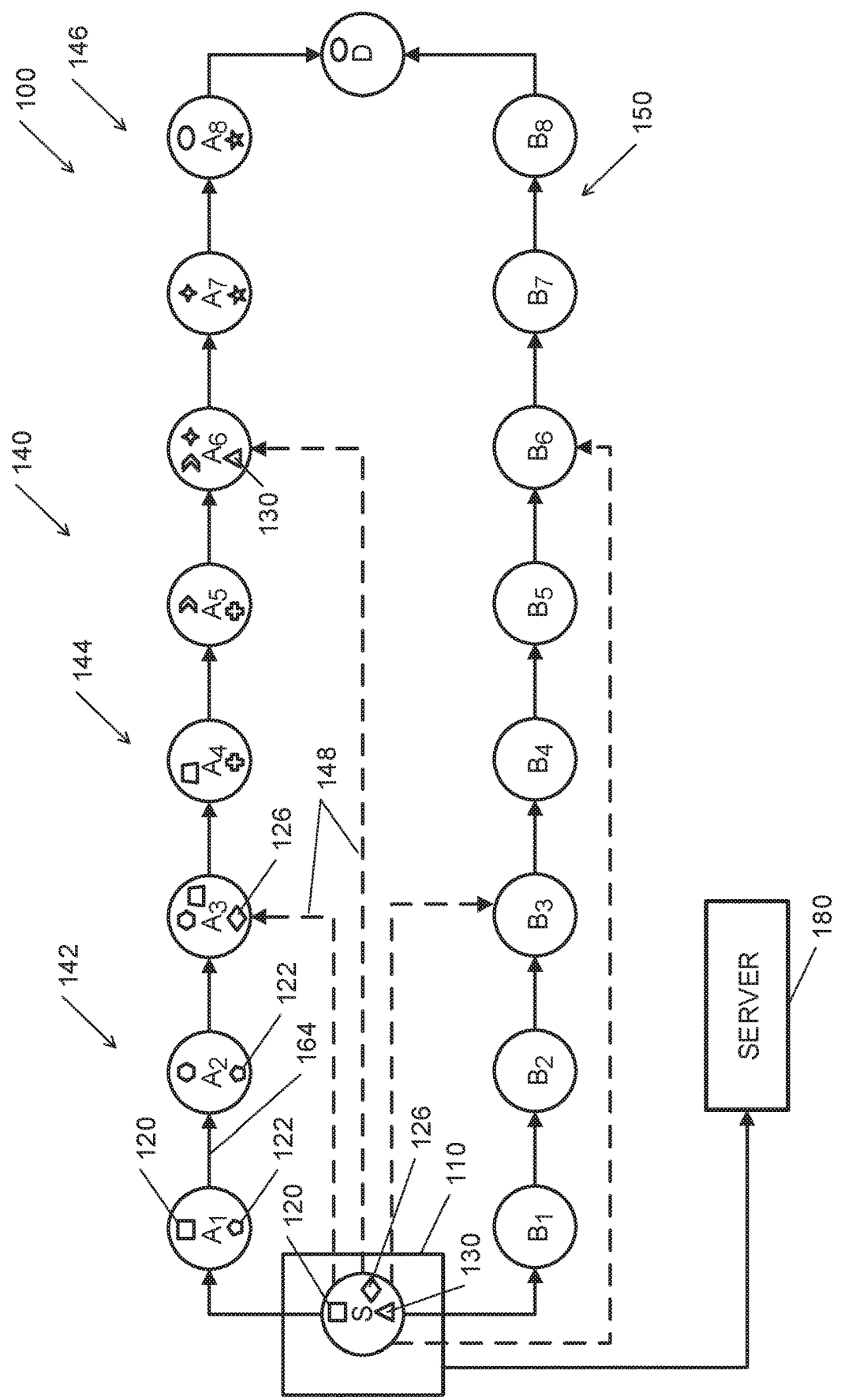
FIG. 1 schematically illustrates two paths between a source node and a destination node in a social network, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

According to embodiments of the invention, both the data and the metadata of a message sent in a communication network such as a mobile messaging service or social network (e.g., WhatsApp® and Messenger®) may be encrypted. Embodiments of the invention may employ secret sharing for encrypting the data of the message. Thus, a single message may be sent along a plurality of paths or routes (each path or route including a series or nodes also referred to as intermediate nodes), where not a single node at any route or path may obtain enough information for decrypting the message. In addition, embodiments of the invention may provide for encrypting or hiding the metadata as disclosed herein.

For example, encrypting metadata of a message in a network according to embodiments of the invention may include establishing a symmetric key for pairs of adjacent nodes; sending at least a portion of a message from a source node to a destination node in at least one path by: dividing the path connecting the source node and the destination node into a plurality of sub-paths, wherein each two contiguous sub-paths are connected by an anchor node, wherein each of the anchor nodes is adjacent to the source node in the network, thus having a symmetric key with the source node; within each sub-path in the path: encrypting, by a first node in a sub-path using a symmetric key the first node shares or has with a next node in the sub-path, a list of remaining nodes of the sub-path, and an encrypted form of a remaining portion or section of the path to obtain a layered encrypted path, wherein the remaining portion or section of the path is encrypted using the symmetric key the next anchor node in the sub-path shares with the source node; sending the portion of the data of the message together with the layered encrypted path to a next node in the sub-path; upon receiving the layered encrypted path at the next node: decrypting the layered encrypted path using the symmetric key the first node shares with the next node in the sub-path; and only if the next node is an anchor node, decrypting a next sub-path using the symmetric key of the anchor node and the source node.

Embodiments of the invention pertain, inter alia, to the technology of communication network including social network services, and mobile messaging applications. Embodiments may provide an improvement to messaging, communications or social network services technology by for example improving the security of the users and hiding metadata of sent messages. Current end-to-end encryption protocols typically encrypt the sent data. Thus, an eavesdropper cannot read the sent data (e.g. the actual message, or the substantive portion of the message). However, the eavesdropper may read the metadata (e.g. data related to the actual message, such as details describing the message or the data, but not the substantive data itself), e.g., an eavesdropper may know the source and the destination of the message, as well as other details as the time the message was sent, the length of the message, etc. Thus, an eavesdropper can know who sends a message to whom, at what time and at what length. Embodiments of the invention may provide a method for hiding metadata, so that an eavesdropper may not be able to reveal the source, the destination, or any other information related to an intercepted message.

Figure 5:
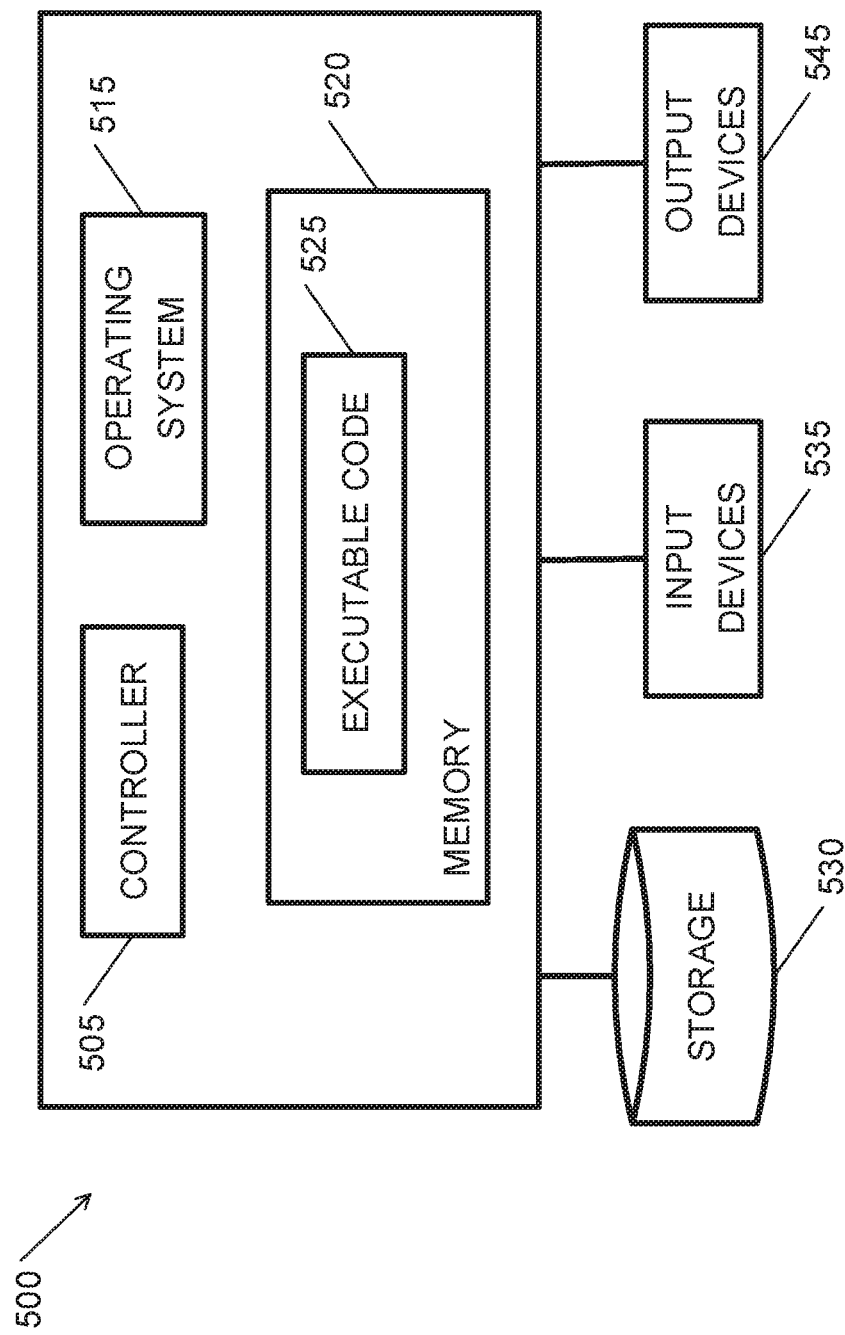
FIG. 5 is a high-level block diagram of an exemplary computing device according to some embodiments of the present invention.

Reference is made to FIG. 1, which schematically illustrates two paths 140, 150 between a source node, S, and a destination node, D, in a communications system, messaging system or social network 100, according to embodiments of the invention. Social network 100 may be or may include a messaging application, such as mobile messaging applications. Social network 100 may include nodes, processes or entities S, D, $A_1$-$A_8$ and $B_1$-$B_8$ and connections 164 between nodes, processes or entities S, D, $A_1$-$A_8$ and $B_1$-$B_8$. As used herein a node S, D, $A_1$-$A_8$ and $B_1$-$B_8$ in network 100 may refer to a user, an account of a user, or a computer operated by a user (e.g. as shown in FIG. 5) in a communications system, messaging system or social network 100. Nodes processes or entities S, D, $A_1$-$A_8$ and $B_1$-$B_8$ may be "virtual" in the sense of being instantiated, represented, or executed as one or more processes on a smartphone, a mobile computing device, a server or a computer 110 (e.g. as shown in FIG. 5), such that the processes relate to each other as discussed herein. Further, actions such as processing, computing, calculating, determining, transmitting, encrypting or the like that are performed by a node, may be performed by a processor such as a server (e.g. as shown in FIG. 5), such that the processor executes one or more processes that processes, computes, calculates, determines, transmits, encrypts, etc.

Two nodes may be referred to herein as adjacent nodes or neighbors if they are connected, e.g., nodes $A_1$ and $A_2$ may represent adjacent or neighboring nodes, as they are connected by connection 164 in social network 100. For example, nodes may become connected and thus adjacent when the users of these nodes establish a connection between them, or become "friends". In some networks, nodes may become adjacent nodes or neighbors on the fly, e.g., in the first time one node sends a message to another. In some networks, a list of connections of a node may be stored in the node and a list of all connections may be stored in server 180. According to embodiments of the invention, any two adjacent nodes, e.g., nodes $A_1$ and $A_2$, may exchange a symmetric key 122, for example, in an initialization phase. According to some embodiments, the symmetric key, e.g., symmetric key 122 of nodes $A_1$ and $A_2$, may include an x-value and a y-value of a first metadata share, ($x_{key1}$, $y_{key1}$) and a second x-value value, $x_{key2}$ of a second metadata share. The second metadata share may include a secret value (e.g., the remaining portion of the path) as disclosed herein, and a linear line may connect the two metadata shares. Reconstructing the liner line may reveal the remaining portion of the path.

Nodes in network 100 may be a source node S, e.g., a node that sends a message, a destination node D, e.g., a node that receives the message, or an intermediate node $A_1$-$A_8$ and $B_1$-$B_8$, e.g., a node along a path or route 140 and 150 of the message, that receives at least a part or a portion of a message and transmits it to the next intermediate node on path or route 140 and 150 or to destination node D. A path 140 and 150 may be a route from source node S to destination node D through intermediate nodes, processes or entities S, D, $A_1$-$A_8$ and $B_1$-$B_8$. Thus, in network 100, messages, or parts of messages, may not be sent directly from source node S to destination node D, but rather through the intermediate nodes $A_1$-$A_8$ and/or $B_1$-$B_8$ along path 140 and/or 150. Some of intermediate nodes, e.g., nodes, processes or entities $A_3$, $A_6$, $B_3$ and $B_6$ may also be anchor nodes. According to embodiments of the invention, network 100 may include a server 180 that may handle management tasks of network 100. For example, server 180 may find a plurality of paths or routes 140 and 150 from each node S, D, $A_1$-$A_8$ and $B_1$-$B_8$, to each of its adjacent nodes. Server 180 may distribute the plurality of paths or routes 140 and 150 to nodes S, D, $A_1$-$A_8$ and $B_1$-$B_8$. It should be readily understood that practically every node in network 100 may be a source node, a destination node, an intermediate node and an anchor node, depending on which nodes sends a message to which node, and on the system configuration, e.g., the paths designed by server 180.

Figure 2:
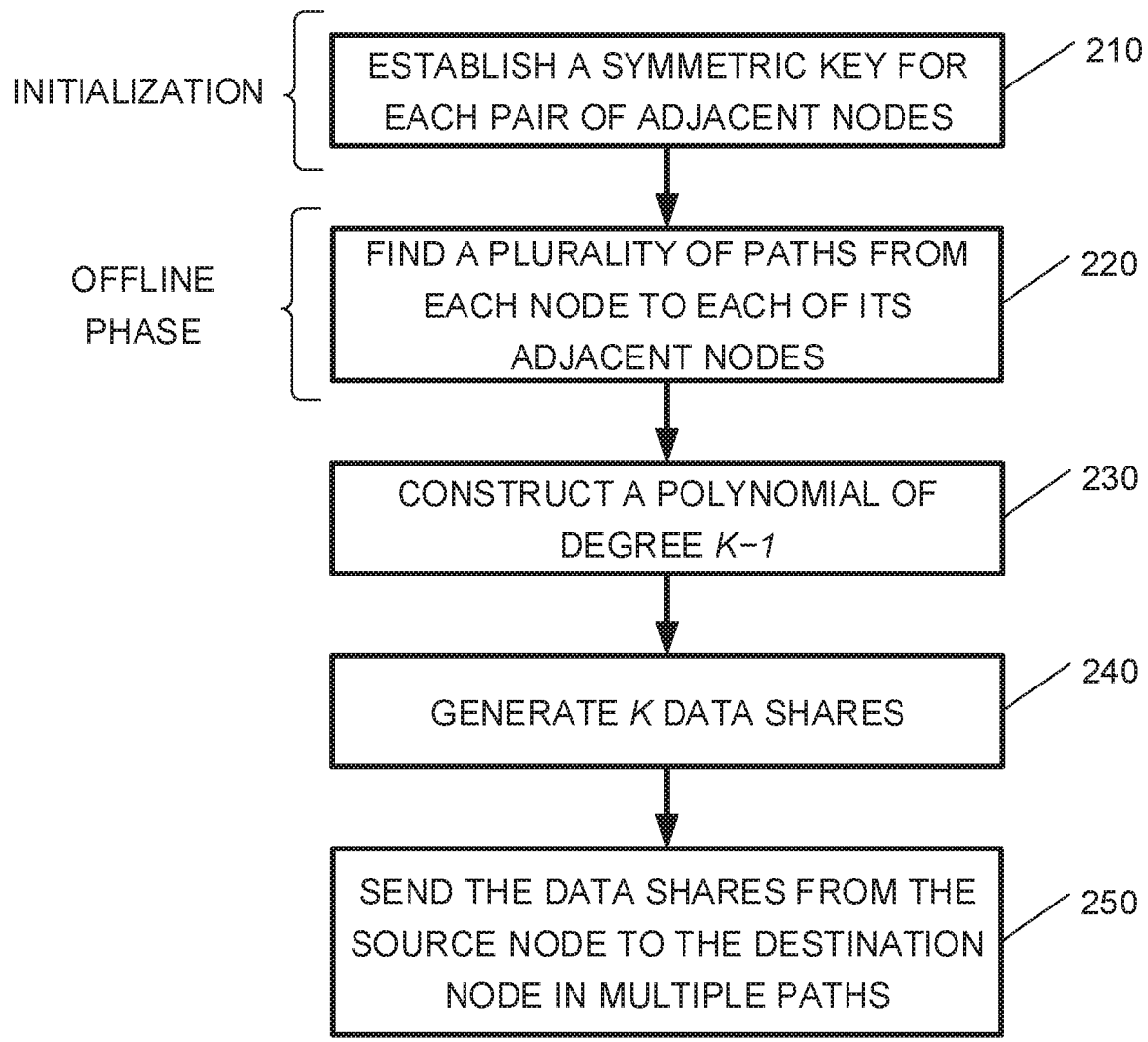
FIG. 2 is a flowchart of a method for transmitting a message in a social network, according to embodiments of the present invention.

Reference is now made to FIG. 2 which is a flowchart of a method for transmitting a message in a social network, according to embodiments of the present invention. The method for transmitting a message may be performed, for example, by network 100 presented in FIG. 1. According to embodiments of the invention, both the data and the metadata of the message may be encrypted or hidden, thus preventing the theoretical possibility of an eavesdropper to decrypt the data or the metadata of the message.

In operation 210, a symmetric key may be established for each pair of adjacent nodes, entities or processes such that each node in the pair has the same key or shares the same key, for example symmetric key 122 may be established for nodes $A_1$ and $A_2$ in FIG. 1. According to embodiments of the invention, the symmetric key may include a first metadata share, $(x_{key1}, y_{key1})$, and a second x-value, $x_{key2}$ of a second metadata share. Each pair of adjacent nodes $A_1$ and $A_2$ may establish a symmetric key 122 according to any applicable method. For example, adjacent nodes may use any PKI protocol such as Diffie-Hellman or Rivest-Shamir-Adleman (RSA) in order to establish and share a symmetric key. Each node, e.g., nodes, processes or entities S, D, $A_1$-$A_8$ and $B_1$-$B_8$, may use a public key of server 180 to issue a secure channel with server 180, e.g. transport layer security (TLS), and each pair of adjacent nodes $A_1$ and $A_2$ may share a symmetric key 122 through server 180 using their secure channels with server 180. In that case, server 180 may only be an intermediate and is not exposed to the symmetric keys. Operation 210 may be performed once, or occasionally for each pair of adjacent nodes.

According to some embodiments, operation 210 may be performed in an initialization phase. According to some embodiments, the symmetric key between each two adjacent nodes may be replaced at known intervals, e.g., after each message. The new symmetric key may be sent encrypted using the old symmetric key, or via the server using PKI, as disclosed herein.

In operation 220 a plurality of paths from nodes, processes or entities S, D, $A_1$-$A_8$ and $B_1$-$B_8$ to their adjacent nodes, processes or entities may be found, defined, established or designed. Operation 220 may be performed off-line, e.g., as a part of an initialization process, or occasionally. Operation 220 may be partially or fully repeated whenever there is a change in the network topology, e.g., if a node is added or removed, or if two nodes become or stop to be adjacent nodes. In some embodiments, paths are found in response to a request from source node S. In operation 220 server 180 may run a process on the network topology and find paths up to a preconfigured length from each node to each of its adjacent nodes, or from some or a subset of nodes to some of their adjacent nodes. Server 180 may also designate anchor nodes, processes or entities, e.g., anchor nodes, processes or entities $A_3$, $A_6$, $B_3$ and $B_6$, along each path. The anchor nodes may be adjacent to or neighbor nodes of the source node. Server 180 may send, e.g., over a secure channel, these paths and anchor nodes to each node. The paths may be updated periodically and after a change in the topology of network 100, e.g., node or connection creation or deletion.

Paths from any source node S to any destination node D may be found according to any applicable method, as known in the art. For example, to find the paths from a source node, e.g., source node S, to all of its adjacent nodes, server 180 may execute, for example, a depth first traversal on a directed graph of network 100, starting the traversal from the source node. Server 180 may keep storing the visited vertices in an array of paths. If during the traversal server 180 reaches a vertex of an adjacent node, server 180 saves the content of the paths array as a path to that adjacent node. Server 180 may mark current vertices in the path array as visited, so the traversal may not go into a cycle.

As indicated before, the anchor nodes may need to be adjacent to the source node. Thus, in some embodiments, the process of creating a route may include picking t anchor nodes, and then creating a sub-path connecting each two anchor nodes, e.g., a sub-path from the source node to the first anchor node, from the first anchor node to the second anchor node and so on until the destination node. Then, all sub-paths may be concatenated to a single path.

According to embodiments of the invention, massages may be encrypted using secret sharing. Secret sharing is a scheme for distributing a secret among multiple participants. For example, the secret, denoted as s, may be the free coefficient in the polynomial:

$$p(x)=a_0+a_1*x+a_2x^2+\ldots a_{k-1}*x^{k-1},$$

where k−1 is the degree of the polynomial, and $a_1, a_2 \ldots a_{k-1}$ are randomly selected coefficients. Shares may include points on the polynomial $(x_i, y_i)$. If at least k points on the polynomial are known, the polynomial may be constructed and the secret, $a_0$, may be revealed. For example, two points $(x_0, y_0)$ and $(x_1, y_1)$ are required to construct a line equation. The shares $(x_i, y_i)$ may be sent from one entity to the other in multiple routs where none of the nodes on these routs may see or receive k or more shares. A subset of less than k shares is useless, since the polynomial cannot be reconstructed. For example, a single point on a line may provide zero information about a specific line. The polynomial and the secret $a_0$ may be reconstructed only if at least k points on the polynomial are known.

In operation 230, a polynomial of degree k−1 may be constructed, e.g., by source node S. The polynomial may be constructed based on the data of the message, so that the data may be derived from the polynomial. For example, the data may be a free coefficient of the polynomial, e.g., $a_0$ of polynomial p(x).

In operation 240, at least k different $x_i$ values may be chosen and respective $y_i$ values of the polynomial may be calculated for each of the $x_i$ values. Each pair of an $x_i$ value and a respective $y_i$ value may be referred to herein as a data share $(x_i, y_i)$.

In operation 250, the data shares $(x_i, y_i)$ may be sent from source node S to destination node D in a plurality of paths, as disclosed herein, where no intermediate node on the k paths obtains k or more data shares. The metadata of the message, including the source node and the destination node may be encrypted as disclosed herein. Referring to FIG. 1, one share of the message may be sent from source node S to destination node D along path 140 via intermediate nodes $A_1$-$A_8$ and a second share of the message may be sent along path 150 via intermediate nodes $B_1$-$B_8$.

In some embodiments, the data of the message may be divided or partitioned into smaller chunks of a predetermined length, e.g., bytes, and operations 230, 240 and 250 may be repeated for each of the chunks or bytes.

According to some embodiments, source node S may encrypt the metadata of the message as disclosed herein. For example, the metadata may be encrypted based on or using the symmetric key the source node has, shares or co-owns with the next (e.g. subsequent or adjacent, along a path from a source to destination node) node on a path (e.g., symmetric key 120 source node S shares with node $A_1$ in path 140), and on the symmetric key the source node shares with each anchor node on the path (e.g., symmetric key 126 source node S shares with anchor node $A_3$ and symmetric key 130 source node S shares with anchor node $A_6$ in path 140).

For example, source node S may use the symmetric key source node S has, shares or co-owns with the last anchor node on the path to encrypt the last sub-path to obtain y_anchor$_n$, where n indicates the n-th and last anchor node. Next, source node S may use the symmetric key source node S shares with the previous anchor node on the path, e.g., anchor node n−1, one anchor node before the last anchor node, and encrypt the sub-path between anchor node n−1 and anchor node n together with (or concatenated with) y_anchor$_n$ to get y_anchor$_{n-1}$, and so on until lastly, source node S may use the symmetric key source node S shares with the first node on the path to encrypt the first sub-path together with (or concatenated with) y_anchor$_1$.

For example, in path 140 presented in FIG. 1, source node S may use symmetric key 130 source node S shares or has with anchor node $A_6$, which is the second and last anchor node on path 140 to encrypt nodes $A_7$, $A_8$ and D (e.g., encrypt data representing nodes $A_7$, $A_8$ and D, for example, the node address), which form the last sub-path, to obtain y_anchor$_2$. Next, source node S may use symmetric key 126 source node S shares with anchor node $A_3$, the previous anchor node on path 140 (and at the same time the first anchor node on path 140), and encrypts nodes $A_4$ and $A_5$ and $A_6$, which form the sub-path between anchor node $A_3$ and anchor node $A_6$ together with (or concatenated with) y_anchor$_2$ to get y_anchor$_1$. Lastly, source node S may use symmetric key 120 source node S shares with node $A_1$, which is the first node on path 140, to encrypt nodes $A_2$ and $A_3$, which form the first sub-path together with (or concatenated with) y_anchor$_1$.

Figure 3:
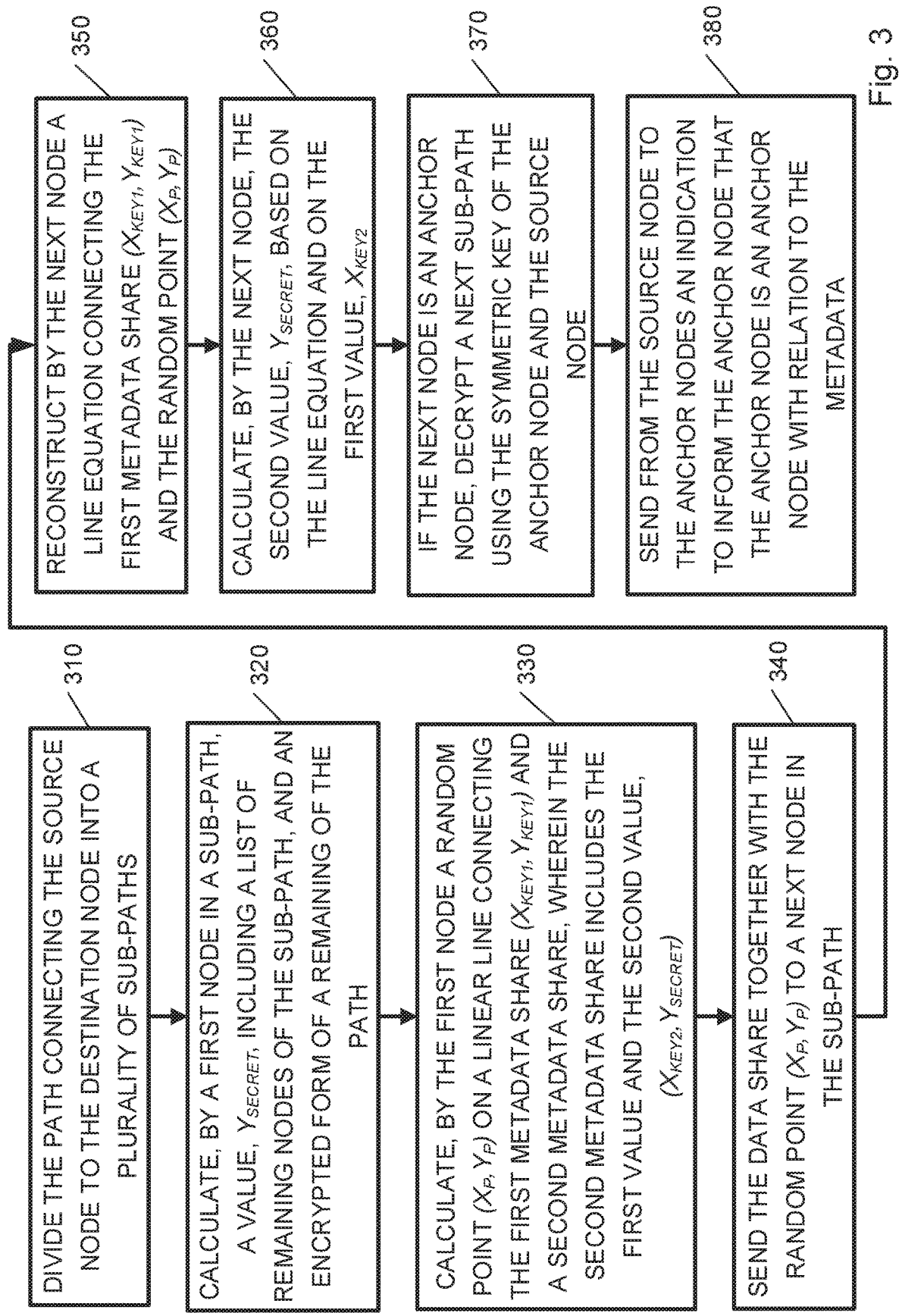
FIG. 3 is a flowchart of a method for encrypting metadata of a message in a social network, according to embodiments of the present invention.

Reference is now made to FIG. 3 which is a flowchart of a method for encrypting metadata of a message in a social network, according to embodiments of the present invention. The method for encrypting metadata of a message may be an elaboration of operation 250 presented in FIG. 2, and may be performed, for example, by network 100 presented in FIG. 1. According to embodiments of the invention, the method presented in FIG. 3 may be used to send any type of encrypted or not encrypted data, e.g., data encrypted by secret sharing and/or other encryption algorithms. The method for transmitting a data share along a path presented in FIG. 3 may be repeated for each path of the paths used in operation 250.

In operation 310, each path connecting the source node to the destination node may be partitioned or divided into a plurality of sub-paths. Each two contiguous (e.g. connecting to each other or adjacent) sub-paths may be connected by an anchor node, and each of the anchor nodes may be adjacent to the source node in the social network, thus sharing or having a symmetric key with the source node.

For example, in the network presented in FIG. 1, the method for encrypting metadata of a message in a social network presented in FIG. 3 may be repeated for the parts of the message sent along paths 140 and 150. Nodes, processes or entities $A_3$ and $A_6$ may function as the anchor nodes of path 140, and nodes, processes or entities $B_3$ and $B_6$ may function as the anchor nodes of path 150. Thus, a first sub-path 142 of path 140 may include nodes $A_1$, $A_2$, $A_3$, a second sub-path 142 of path 140 may include nodes $A_4$, $A_5$ and $A_6$, and a third sub-path 142 of path 140 may include nodes $A_7$, $A_8$ and destination node D. Dashed lines 148 may represent the connection between anchor nodes $A_3$, $A_6$, $B_3$ and $B_6$ and source node S.

In operation 320, a node in a sub-path, designated as node i, may calculate a secret value, $y_{secret}$ of a second metadata share. $y_{secret}$ may include a list of remaining nodes of the sub-path, e.g., the next nodes in the sub-path, up to and including the next anchor node, and an encrypted form of a remaining portion or section of the path, e.g., the next or subsequent sub-paths of the path (e.g. the subsequent sub-path along a route from a source to destination node), if there are any. Node, process or entity i may be the source node (e.g., source node S) or any intermediate node along the path (e.g., nodes $A_1$-$A_8$ and $B_1$-$B_3$).

For example, referring to path 140 in FIG. 1, encrypted $y_{secret}$ (also referred to herein as a layered encrypted path) from source node S to node $A_1$ may be:

$$k_{S,A_1}[n_1,A_1,A_2,A_3,k_S,A_3[n_2,A_4,A_5,A_6,k_S,A_6[N_3,A_7,A_8D]]]$$

where $n_j$ is the number of nodes in the j-th sub-path, $A_i$ is the i-th node, S is the source node, D is the destination node, and $k_{Ai1,Ai2}$[msg] represent an encrypted form of the msg (e.g., the remining of the path) encrypted by symmetric key 122 of $A_{i1},A_{i2}$. Thus, $y_{secret}$ of source node S and node $A_1$ may include a list of the remaining nodes of sub-path 142, e.g., nodes $A_1$, $A_2$, $A_3$, and an encrypted form of a remaining portion or section of path 140, e.g., $k_s,A_3[n_2,A_4,A_5,A_6,k_s,A_6[n_3,A_7,A_8,D]]$ encrypted by the symmetric key of the next or subsequent anchor along the path, in this example, symmetric key 126 of node $A_3$ with S.

In operation 330, a linear line equation for a linear line connecting the first metadata share ($x_{key1}$, $y_{key1}$) of the symmetric key and a second metadata share, ($x_{key2}$, $y_{secret}$), including the second x-value of the symmetric key, $x_{key2}$, and the secret value, $y_{secret}$, may be calculated, e.g., by node i. Node i may generate a layered encrypted path by calculating or selecting a random point ($x_p$, $y_p$) on the linear line connecting the first metadata share ($x_{key1}$, $y_{key1}$) of the symmetric key and a second metadata share, including the second x-value, $x_{key2}$, and the secret value $y_{secret}$, ($x_{key2}$, $y_{secret}$). According to some embodiments, $y_{secret}$ may be partitioned or divided into chunks of a predetermined length, e.g., bytes. Thus, a linear line equation may be calculated and a random point ($x_p$, $y_p$) may be selected for each chunk or byte. In operation 340, node i may send a data share, ($x_i$, $y_i$), together with the random point ($x_p$, $y_p$), or the plurality of random points ($x_p$, $y_p$) calculated for each chunk or byte to a next (e.g. subsequent along a path) node, i+1, in the sub-path.

In operation 350, the next or subsequent node, process or entity on or along the sub-path (e.g. moving from a source to a destination), e.g., node i+1, may receive the data share, together with the random point or points ($x_p$, $y_p$). Upon receiving a random point ($x_p$, $y_p$) at the next node, the next node may reconstruct or calculate a line equation connecting the first metadata share ($x_{key1}$, $y_{key1}$), that may be a part of the symmetric key node i+1 shares or has with node i, and the random point ($x_p$, $y_p$). Thus, the next node (e.g., the node after node i in the path) may have the linear line equation used by the previous node i (e.g., the node before node i+1 in the path) in operation 330. This operation may be repeated for each of the obtained random points ($x_p$, $y_p$). In operation 360, the next node may calculate the secret value, $y_{secret}$, based on the line equation and on the second x-value, $x_{key2}$, that is known to the next node as part of the symmetric key the next node shares or has with the previous node i. If in operation 330 $y_{secret}$ was divided into chunks, all chunks of the second value, $y_{secret}$, may be calculated in operation 360.

The following example refers to route 140 in FIG. 1. For simplicity of the description, explanation will be made referring to a single $y_{secret}$, however, it should be readily understood that this is not limiting and that $y_{secret}$ may be divided into a plurality of chunks or bytes as disclosed herein. When node $A_1$ receives the random point ($x_p$, $y_p$) from source node S, node $A_1$ may reconstruct or calculate the line equation connecting the first metadata share ($x_{key1}$, $y_{key1}$), that may be a part of symmetric key 120 node $A_1$ shares or has with source node S, and the random point ($x_p$, $y_p$) node $A_1$ received from source node S. After reconstructing the line equation, node $A_1$ may reveal or calculate the second value, $y_{secret}$, based on the line equation and on the second x-value, $x_{key2}$, that is known to node $A_1$ as part of symmetric key 120 node $A_1$ shares or has with source node S. As indicated herein $y_{secret}$ of source node S and node $A_1$ is $kS,A_1[n_1,A_1,A_2,A_3,kS,A_3[n_2,A_4,A_5,A_6,kS,A_6[n_3,A_7,A_8,D]]]$. Thus, after calculating $y_{secret}$, $A_1$ may know the next nodes in sub-path 142, to which node $A_1$ pertains. The remaining portion of path 140 is not decrypted by node $A_1$ since it is encrypted using a key that is not known to node $A_1$ (e.g., symmetric key 126 anchor node $A_3$ shares or has with source node S). Thus, an eavesdropper listening to node $A_1$, may only gain information regarding the remaining portion of sub-path 142, however, the remaining portion or section of the path, including the destination node D, may not be available to the eavesdropper or to any of the nodes in the sub-path, e.g. $A_1$.

Node $A_1$ may encrypt the rest of sub-path 142 with symmetric key 122 node $A_1$ shares or has with node $A_2$, so $y_{secret}$ of node $A_1$ and node $A_2$ may be:

$k_{A1,A2}[n_1-1,A_2,A_3,k_s,A_3[n_2,A_4,A_5,A_6,k_s,A_6[n_3,A_7,A_8,D]]]$ $A_1$ may provide $y_{secret}$ to $A_2$ by calculating a liner line equation and sending a random point on the line, as disclosed herein.

If the next node is an anchor node, then, after decrypting the message (e.g., using the symmetric key with the previous node in the sub-path), in operation 370, the anchor node may decrypt the next sub-path using the symmetric key of the anchor node and the source node. Thus, according to embodiments of the invention, each node along a sub-path may decrypt $y_{secret}$ (using the symmetric key with the previous node) to reveal the remaining portion or section of the sub-path and an encrypted form of the remaining portion of the path, while an anchor node may decrypt $y_{secret}$ as any other node, and may further decrypt the result, using the symmetric key the anchor node shares or has with the source node, to obtain anchor_$y_{secret}$ and reveal the nodes in the next sub-path (anchor_$y_{secret}$ may include the nodes in the next sub-path and an encrypted form of the remaining sub-paths of the path, if any).

In some embodiments, the symmetric key the anchor node shares or has with the source node (e.g., symmetric keys 126, 130) is similar to the symmetric key of any two adjacent nodes, includes a first metadata share, ($x_{key1}$, $y_{key1}$), and a second x-value, $x_{key2}$ of a second metadata share. Thus, decrypting anchor_$y_{secret}$ may be similar to decrypting $y_{secret}$, only using the symmetric key the anchor node shares or has with the source node. For example, $y_{secret}$ in an anchor node may include a random point ($x_p$, $y_p$), that together with the first metadata share of the symmetric key of the source node and the anchor node ($x_{key1}$, $y_{key1}$), forms a linear line. The anchor node may reconstruct the linear line equation for a line connecting the first metadata share of the symmetric key of the source node and the anchor node ($x_{key1}$, $y_{key1}$) and the random point included in $y_{secret}$. anchor_$y_{secret}$ may be revealed by finding a corresponding y-value to the second x-value of the symmetric key of the source node and the anchor node, $x_{key2}$ using the linear line equation. Similarly to decrypting $y_{secret}$, anchor_$y_{secret}$ may be divided into bytes or chunks, before being sent as a plurality of random points ($x_p$, $y_p$), each corresponding to a byte or chunk of anchor_$y_{secret}$, and decrypting may be performed to each byte or chunk of anchor_$y_{secret}$.

For example, node $A_3$ may be an anchor node and may have or share the same symmetric key 126 with source node S. $y_{secret}$ calculated by $A_3$ in operation 350 may include $kS,A_3[n2,A_4,A_5,A_6,kS,A6[n3,A_7,A_8,D]]$. $kS,A_3[n2,A_4,A_5,A_6,kS,A_6[n3,A_7,A_3,D]]$ may be encrypted using symmetric key 126 node $A_3$ shares or has with source node S. Node $A_3$ may use symmetric key 126 node $A_3$ shares or has with source node S to decrypt $kS,A_3[n2,A_4,A_5,A_6,kS,A_6[n3,A_7,A_8,D]]$ and obtain anchor_$y_{secret}$ which includes the remaining portion of the path, e.g., $[n2,A_4,A_5,A_6kS,A_6[n3,A_7A_8,D]]$.

In operation 380, an indication may be sent from the source node to each of the anchor nodes along the plurality of paths, e.g., from source node S to nodes $A_3$, $A_6$, $B_3$ and $B_6$. The indication may inform the anchor node that the node is an anchor node with relation to the metadata. In some embodiments, the indication may include a portion of the encrypted form of the remaining portion or section of the path. Other indications may be used. The indication may be sent from source node S to each of the anchor nodes, or from source node S to a one anchor node in each path and between the anchor nodes afterwards, e.g., source node S may send the indication to a first anchor node in each path, e.g., anchor node $A_3$ in path 140 and anchor node $B_3$ in path 150, and the first anchor nodes at each path may send the indication about the source to a next anchor node in the path, e.g., anchor node $A_3$ may send the indication to anchor node $A_6$, and anchor node $B_3$ may send the indication to anchor node $B_6$, and so on until the last anchor node in each path.

Table 1 summarizes $y_{secret}$ for node pairs along path 140 of FIG. 1:

| Nodes | $y_{secret}$ |
| --- | --- |
| (S, $A_1$) | $k_{S, A1}[2, A_2, A_3, k_{S, A3}[2, A_4, A_5, A_6, k_{S, A6}[2, A_7, A_8, D, k_{S, D}[D]]]]$ |
| ($A_1$, $A_2$) | $k_{A1, A2}[1, A_3, k_{S, A3}[2, A_4, A_5, A_6, k_{S, A6}[2, A_7, A_8, D, k_{S, D}[D]]]]$ |

-continued

| Nodes | $y_{secret}$ |
|---|---|
| $(A_2, A_3)$ | $k_{A2, A3}[0, k_{S, A3}[2, A_4, A_5, A_6, k_{S, A6}[2, A_7, A_8, D, k_{S, D}[D]]]]$ |
| $(A_3, A_4)$ | $k_{A3, A4}[2, A_5, A_6, k_{S, A6}[2, A_7, A_8, D, k_{S, D}[D]]]$ |
| $(A_4, A_5)$ | $k_{A4, A5}[1, A_6, k_{S, A6}[2, A_7, A_8, D, k_{S, D}[D]]]$ |
| $(A_5, A_6)$ | $k_{A5, A6}[0, k_{S, A6}[2, A_7, A_8, D, k_{S, D}[D]]]$ |
| $(A_6, A_7)$ | $k_{A6, A7}[2, A_8, D, k_{S, D}[D]]$ |
| $(A_7, A_8)$ | $k_{A7, A8}[1, D, k_{S, D}[D]]$ |
| $(A_8, D)$ | $k_{A8, D}[0, k_{S, D}[D]]$ |

The length of $y_{secret}$ may be different for different nodes along a path. For example, $y_{secret}$ may become shorter as the message approaches the destination node since the remaining portion of the path becomes shorter, as indicated in table 1. Thus, the length of $y_{secret}$ may by itself reveal some information about the path, e.g., if $y_{secret}$ is short, this may indicate that the message is close to the destination node. If $y_{secret}$ is divided into chunks or bytes, that may imply that more random points $(x_p, y_p)$ may be sent.

According to some embodiments $y_{secret}$ may be padded with or have added data (e.g., random data) to be in a predetermined length that is similar along the entire path, so that the length of $y_{secret}$, or the number of corresponding random points $(x_p, y_p)$, would not provide any indication on the path. For example, after an intermediate node decrypts $y_{secret}$, the intermediate node removes the next node from the remaining portion of the sub-path and encrypts a new $y_{secret}$. Thus, the new $y_{secret}$ may include one node less than the former $y_{secret}$. According to some embodiments, the intermediate node may pad, or add, random data, for example at the end of the new $y_{secret}$, so that the length of the new $y_{secret}$ will equal the length of the former $y_{secret}$.

Figure 4:
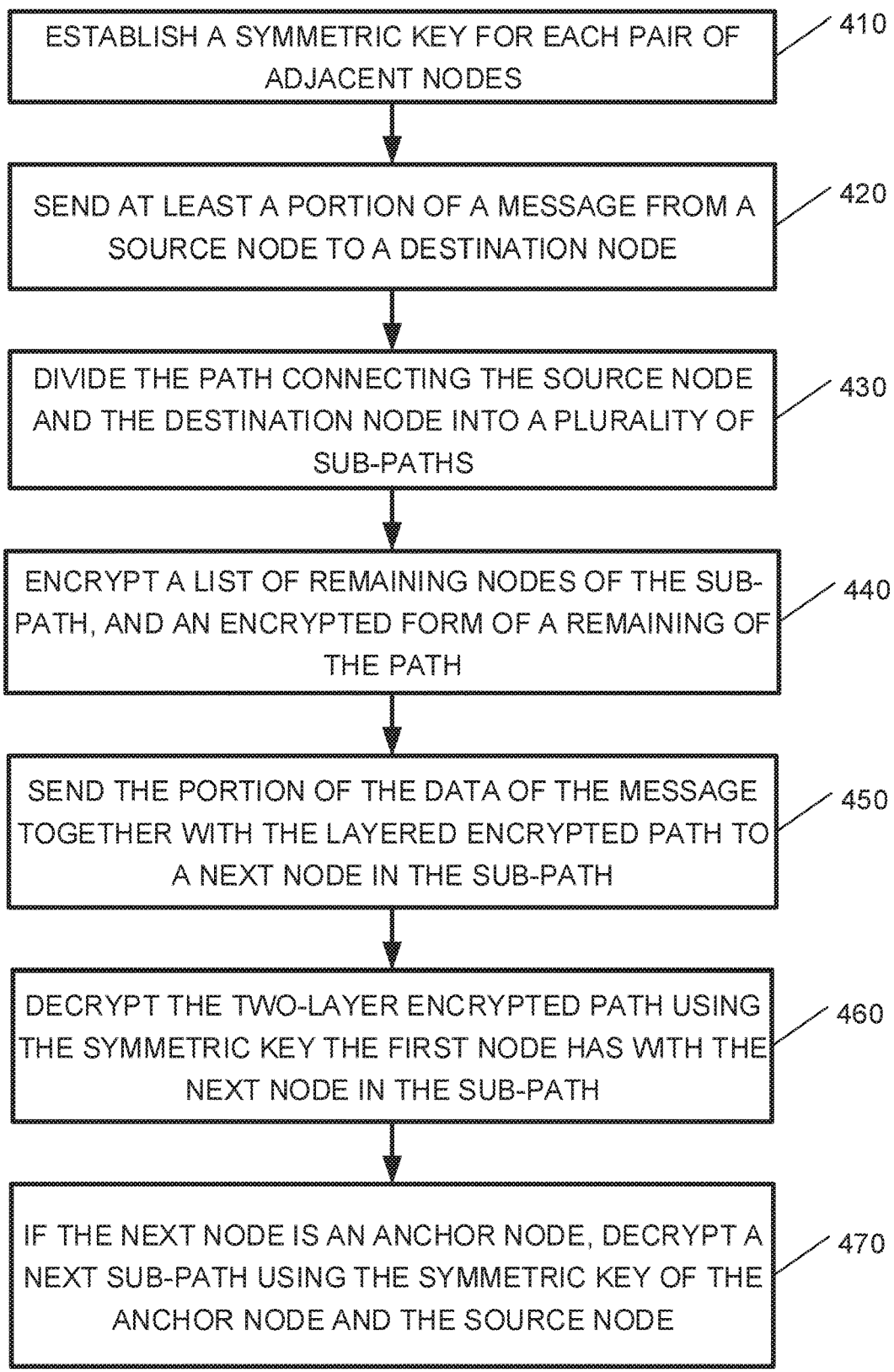
FIG. 4 is a flowchart of a method for encrypting metadata of a message in a social network, according to embodiments of the present invention.

Reference is now made to FIG. 4 which is a flowchart of a method for encrypting metadata of a message in a social network, according to embodiments of the present invention. The message may include data and metadata. The method for encrypting metadata of a message may be performed, for example, by network 100 presented in FIG. 1. According to embodiments of the invention, the method presented in FIG. 4 may be used to send any type of encrypted or not encrypted data, e.g., data encrypted by secret sharing and/or other encryption algorithms. In some embodiments, the method for transmitting data shares along a path presented in FIG. 4 may be repeated for each path of the paths used in operation 250 (except for operation 410).

In operation 410 a symmetric key for each pair of adjacent nodes, processes or entities may be established, similarly to operation 210. In operation 420, at least a portion of a data of the message may be sent from a source node to a destination node in at least one path. The data of the message may be encrypted, e.g., as disclosed herein, or not encrypted. In operation 430, the path connecting the source node and the destination node may be divided into a plurality of sub-paths, similarly to operation 310. In some embodiments, each two contiguous or adjacent sub-paths may be connected by an anchor node, and each of the anchor nodes may be adjacent to the source node in the social network, thus having a symmetric key with the source node. Within each sub-path in the path, a first node in a sub-path may encrypt, using a symmetric key the first node shares or has with a next node in the sub-path, a list of remaining nodes of the sub-path, and an encrypted form of a remaining portion or section of the path to obtain a layered encrypted path, as indicated in operation 440. In some embodiments the remaining portion or section of the path may be encrypted using the symmetric key the next anchor node in the sub-path shares or has with the source node. In some embodiments, encryption of the remaining portion or section of the path may be performed as disclosed herein, e.g., with relation to operations 320 and 330. Other encryption methods may be used. In operation 450, the portion of the data of the message may be sent together with the layered encrypted path to a next node in the sub-path, for example, as in operation 340. Upon receiving the layered encrypted path at the next node, the layered encrypted path may be decrypted using the symmetric key the first node shares or has with the next node in the sub-path, as indicated in operation 460. For example, decryption may be performed as disclosed herein with relation to operations 350 and 360. Other decryption methods may be used. Operation 470 may be performed only if the next node is an anchor node. If the next node is an anchor node, a next sub-path may be decrypted using the symmetric key of the anchor node and the source node, e.g., as disclosed herein. If the next node is not an anchor node, operation 470 is not performed by that node.

Reference is made to FIG. 5, showing a high-level block diagram of an exemplary computing device according to some embodiments of the present invention. Computing device 500 may include a controller 505 that may be, for example, a central processing unit processor (CPU), a graphics processing unit (GPU), a chip or any suitable computing or computational device, an operating system 515, a memory 520, executable code 525, storage or storage device 530, input devices 535 and output devices 545. Controller 505 may be configured to carry out methods described herein, and/or to execute or act as the various modules, units, etc., for example by executing code or software. More than one computing device 500 may be included. Micro-services, engines, processes, and other modules described herein may be for example software executed (e.g., as programs, applications or instantiated processes, or in another manner) by one or more controllers 505. Multiple processes discussed herein may be executed on the same controller.

Operating system 515 may be or may include any code segment (e.g., one similar to executable code 525 described herein) designed and/or configured to perform tasks involving coordination, scheduling, arbitration, supervising, controlling or otherwise managing operation of computing device 500, for example, scheduling execution of software programs or enabling software programs or other modules or units to communicate. Operating system 515 may be a commercial operating system.

Memory 520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 may be or may include a plurality of, possibly different memory units. Memory 520 may be a computer or processor non-transitory readable medium, or a computer non-transitory storage medium, e.g., a RAM.

Executable code 525 may be any executable code, e.g., an application, a program, a process, task or script. Executable code 525 may be executed by controller 505 possibly under control of operating system 515. For example, executable code 525 may be an application that when executed performs the method described herein. Although, for the sake of clarity, a single item of executable code 525 is shown in FIG. 5, a system according to embodiments of the invention may include a plurality of executable code segments similar to executable code 525 that may be loaded into memory 520 and cause controller 505 to carry out methods described herein. For example, units or modules such as nodes S, D, A1-A8 and Ba-B8, and server 180 described herein may be, or may include, controller 505 and executable code 525.

Storage device 530 may be any applicable storage system, e.g., a disk or a virtual disk used by a VM. Storage 530 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content or data may be stored in storage 530 and may be loaded from storage 530 into memory 520 where it may be processed by controller 505. in some embodiments, some of the components shown in FIG. 5 may be omitted. For example, memory 520 may be a non-volatile memory having the storage capacity of storage 530. Accordingly, although shown as a separate component, storage 530 may be embedded or included in memory 520. Repository 170 may be implemented over storage 530.

Input devices 535 may be or may include a mouse, a keyboard, a touch screen or pad or any suitable input device. It will be recognized that any suitable number of input devices may be operatively connected to computing device 500 as shown by block 535. Output devices 545 may include one or more displays or monitors, speakers and/or any other suitable output devices. It will be recognized that any suitable number of output devices may be operatively connected to computing device 500 as shown by block 545. Any applicable input/output (I/O) devices may be connected to computing device 500 as shown by input devices 535 and output devices 545. For example, a wired or wireless network interface card (NIC), a printer, a universal serial bus (USB) device or external hard drive may be included in input devices 535 and/or output devices 545.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 520, computer-executable instructions such as executable code 525 and a controller such as controller 505.

The storage medium may include, but is not limited to, any type of disk including, semiconductor devices such as read-only memories (ROMs) and/or random access memories (RAMS), flash memories, electrically erasable programmable read-only memories (EEPROMs) or any type of media suitable for storing electronic instructions, including programmable storage devices. For example, in some embodiments, memory 520 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 505), a plurality of input units, a plurality of output units, a plurality of memory units, and a plurality of storage units. A system according to some embodiments of the invention may additionally include other suitable hardware components and/or software components. In some embodiments, a system may include or may be, for example, a personal computer, a desktop computer, a laptop computer, a workstation, a server computer, a network device, or any other suitable computing device. For example, a system or a node according to some embodiments of the invention as described herein may include one or more devices such as computing device 500.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

What is claimed is:

1. A method for encrypting metadata of a message in a network having a plurality of nodes, the method comprising:
   sending at least a portion of a message from a source node to a destination node in at least one path including a plurality of intermediate nodes, wherein at least one of the plurality of intermediate nodes is an anchor node by:
   establishing a symmetric key for each pair of adjacent nodes along the at least one path;
   dividing the path connecting the source node and the destination node into a plurality of sub-paths, wherein each two contiguous sub-paths are connected by an anchor node, wherein each given anchor node is adjacent to the source node in the social network and sharing a symmetric key with the source node;
   for each pair of adjacent nodes within a sub-path in the path:
   a. encrypting, by a first node in a pair of adjacent nodes using a symmetric key the first node shares with a next node in the pair of adjacent nodes, a list of remaining nodes of the sub-path, and an encrypted form of a remaining portion of the path to obtain a layered encrypted path, wherein the remaining portion of the path is encrypted using the symmetric key the next anchor node in the sub-path shares with the source node;

b. sending, by the first node, the portion of data of the message together with the layered encrypted path to the next node; and upon receiving the layered encrypted path at the next node:

c. decrypting the layered encrypted path using the symmetric key the first node shares with the next node; and d. if the next node is an anchor node, decrypting a next sub-path using the symmetric key of the anchor node and the source node.

2. The method of claim 1, wherein the symmetric key for each pair of adjacent nodes comprises a first metadata share, $(x_{key1}, y_{key1})$, and a first value, $x_{key2}$, the method comprising:

wherein encrypting the list of remaining nodes of the sub-path, and the encrypted form of the remaining portion of the path comprises:

calculating, by the first node, a second value, $y_{secret}$, comprising the list of remaining nodes of the sub-path, and the encrypted form of the remaining portion of the path;

calculating, by the first node a random point $(x_p, y_p)$ on a linear line connecting the first metadata share $(x_{key1}, y_{key1})$ and a second metadata share, wherein the second metadata share comprises the first value and the second value, $(x_{key2}, y_{secret})$;

sending the portion of the encrypted data together with the random point $(x_p, y_p)$ to a next node in the sub-path;

and wherein decrypting the layered encrypted path comprises:

reconstructing by the next node the line equation connecting the first metadata share $(x_{key1}, y_{key1})$ and the random point $(x_p, y_p)$;

calculating, by the next node, the second value, $y_{secret}$, based on the line equation and on the first value, $x_{key2}$; and if the next node is an anchor node, decrypting a next sub-path using the symmetric key of the anchor node and the source node.

3. The method of claim 2, comprising:
padding the second value, $y_{secret}$, by the first node to a predetermined length.

4. The method of claim 1, comprising:
finding a plurality of paths from each node to each of its adjacent nodes; and
encrypting the data of the message by:
constructing a polynomial of degree k−1, wherein the data is derivable from the polynomial;
choosing at least k different $x_i$ values and calculating respective $y_i$ values of the polynomial for each of the $x_i$ values, wherein each pair of an $x_i$ value and a respective $y_i$ value constitutes a data share $(x_i, y_i)$,
wherein the data of the message is a free coefficient of the polynomial,
wherein sending at least a portion of the message comprising sending at least a portion of the encrypted data,
wherein the portion of the encrypted data comprises the data share $(x_i, y_i)$, and
wherein no intermediate node on the at least one path obtains k or more data shares.

5. The method of claim 4, wherein sending the portion of the data within each sub-path on the path comprises:
dividing the second value, $y_{secret}$, into a plurality of chunks; and
repeating operations a-b for each of the chunks.

6. The method of claim 1, comprising:
sending from the source node to the anchor nodes an indication to inform the anchor node that the anchor node is an anchor node with relation to the metadata.

7. The method of claim 6, wherein the indication is a portion of the encrypted form of the remaining portion of the path.

8. The method of claim 1, wherein the symmetric key between each pair of adjacent nodes is replaced at known intervals.

9. The method of claim 1, wherein the symmetric key between each pair of adjacent nodes is replaced following a request of the source node.

10. The method of claim 1, wherein decrypting a next sub-path using the symmetric key of the anchor node and the source node comprises:
reconstructing a second linear line equation for a line connecting a first metadata share of the symmetric key of the source node and the anchor node $(x_{key1}, y_{key1})$ and a random point included in $y_{secret}$; and
finding a corresponding y-value to a first value of the symmetric key of the source node and the anchor node, $x_{key2}$ using the second linear line equation.

11. The method of claim 1, comprising designating anchor nodes along the paths.

12. A method for encrypting metadata of a message in a network comprising a plurality of nodes, wherein each pair of adjacent nodes have or share the same symmetric key, wherein the symmetric key comprises a first x-value and a first y-value of a first metadata share, and a second x-value, the plurality of nodes comprising a source node, a destination node, and a plurality of intermediate nodes, wherein at least one of the intermediate nodes is an anchor node, the at least one anchor node adjacent to the source node in the social network, thus having a symmetric key with the source node, the method comprising:

encrypting the data of the message by:
constructing a polynomial of degree k−1, wherein the data is derivable from the polynomial;
choosing at least k different $x_i$ values and calculating respective $y_i$ values of the polynomial for each of the $x_i$ values, wherein each pair of an $x_i$ value and a respective $y_i$ value constitutes a data share $(x_i, y_i)$,
wherein the portion of the encrypted data comprises the data share $(x_i, y_i)$, wherein no intermediate node on the at least one path obtains k or more data shares, wherein the data of the message is a free coefficient of the polynomial;

sending, by a source node to a destination node through a plurality of intermediate nodes, at least a portion of the data of the message in at least one path;

wherein sending a portion of the data of the message in a path comprises:
dividing the path into a plurality of sub-paths, wherein each two contiguous sub-paths are connected by the at least one anchor node;
calculating a secret value comprising a list of nodes of a first sub-path and an encrypted form of a remaining portion of the path;
calculating a first random point on a linear line connecting a first metadata share of a symmetric key of the source node and a first intermediate node in the path, and a metadata share comprising a second x-value of the symmetric key of the source node and the first intermediate node in the path and the secret value; and sending the portion of the data of the message together with the first random point to the first intermediate node in the path.

13. The method of claim 12 further comprising:
upon receiving, by an intermediate node of the plurality of intermediate nodes, a second random point from a previous node in the path, performing by the intermediate node:
reconstructing a line equation connecting the first metadata share of the symmetric key of the previous node in the path and the intermediate node, and the second random point;
calculating a current secret value based on the line equation and on the second x-value of the symmetric key of the previous node in the path and the intermediate node;
if the intermediate node is an anchor node, decrypting a next sub-path using the symmetric key of the anchor node and the source node;
calculating a new secret value, comprising a list of nodes of a remaining portion of a sub-path, and an encrypted form of a remaining portion of the path;
calculating a new random point on a new linear line connecting a first metadata share of a symmetric key of the intermediate node and a next intermediate node in the path, and a metadata share comprising a second x-value of the symmetric key of the intermediate node and a next intermediate node in the path and the new secret value; and
sending the portion of the data of the message together with the new random point to the next intermediate node in the sub-path.

14. A system for encrypting metadata of a message in a social network, the system comprising:
a plurality of nodes, wherein each node comprises a hardware processor, wherein each pair of adjacent nodes share a symmetric key, wherein the symmetric key comprises a first x-value and a first y-value of a first metadata share, and a second x-value, and wherein the plurality of nodes comprises:
a source node;
a destination node;
a plurality of intermediate nodes, wherein some of the intermediate nodes are anchor nodes, wherein each of the anchor nodes is adjacent to the source node in the social network, thus having a symmetric key with the source node, wherein a plurality of paths from the source node to the destination node through the intermediate nodes and the anchor nodes are defined;
wherein the source node is configured to send a message to the destination node by:
sending at least a portion of data of the message to the destination node in at least one path;
wherein sending a portion of the data of the message in a path comprises:
dividing the path into a plurality of sub-paths, wherein each two contiguous sub-paths are connected by one of the anchor nodes;
calculating a secret value comprising a list of nodes of a first sub-path and an encrypted form of a remaining portion of the path;
calculating a first random point on a linear line connecting a first metadata share of a symmetric key of the source node and a first intermediate node in the path, and a metadata share comprising a second x-value of the symmetric key of the source node and the first intermediate node in the path and the secret value; and
sending the portion of the data of the message together with the first random point to the first intermediate node in the path,
wherein an intermediate node is configured to, upon receiving a second random point from a previous node in the path:
reconstruct a line equation connecting the first metadata share of the symmetric key of the previous node in the path and the intermediate node, and the second random point;
calculate a current secret value based on the line equation and on the second x-value of the symmetric key of the previous node in the path and the intermediate node;
if the intermediate node is an anchor node, decrypt a next sub-path using the symmetric key of the anchor node and the source node;
calculate a new secret value, comprising a list of nodes of a remaining portion of a sub-path, and an encrypted form of a remaining portion of the path;
calculate a new random point on a new linear line connecting a first metadata share of a symmetric key of the intermediate node and a next intermediate node in the path, and a metadata share comprising a second x-value of the symmetric key of the intermediate node and a next intermediate node in the path and the new secret value; and
send the portion of the data of the message together with the new random point to the next intermediate node in the sub-path.

15. The system of claim 13, comprising encrypting the data of the message by:
constructing a polynomial of degree k−1, wherein the data is derivable from the polynomial;
choosing at least k different $x_i$ values and calculating respective $y_i$ values of the polynomial for each of the $x_i$ values, wherein each pair of an $x_i$ value and a respective $y_i$ value constitutes a data share $(x_i, y_i)$,
wherein the portion of the encrypted data comprises the data share $(x_i, y_i)$, wherein no intermediate node on the at least one path obtains k or more data shares, wherein the data of the message is a free coefficient of the polynomial.

16. The system of claim 13, wherein the source node is further configured to:
send from the source node to the anchor nodes an indication to inform the anchor node that the anchor node is an anchor node with relation to the metadata.

17. The system of claim 16, wherein the indication is a portion of the encrypted form of the remaining portion of the path.

18. The method of claim 13, wherein the symmetric key between each pair of adjacent nodes may be replaced following a request of the source node.

19. The system of claim 13, wherein sending the portion of the data of the message comprises:
dividing the secret value into a plurality of chunks; and
repeating operations of calculating the first random point and sending the portion of the encrypted data for each of the chunks.

20. The system of claim 13, comprising:
padding the new secret value by the intermediate node to a predetermined length.

* * * * *